Dec. 22, 1942.     M. C. RICCIARDI     2,305,637
CHUCK
Filed July 23, 1941
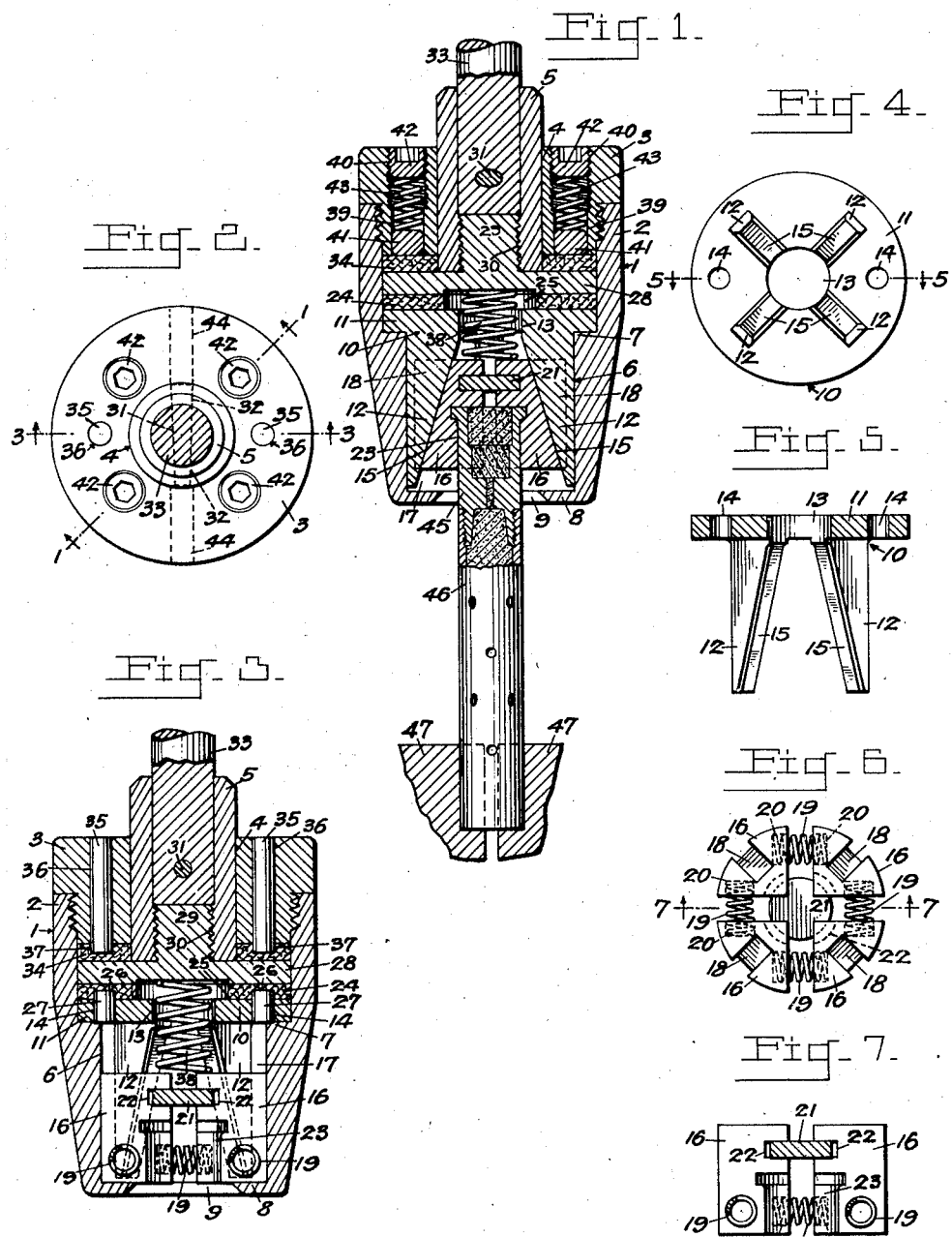
INVENTOR
Matthew C. Ricciardi
BY
ATTORNEYS Patented Dec. 22, 1942

2,305,637

UNITED STATES PATENT OFFICE 2,305,637

CHUCK

Matthew C. Ricciardi, Dover, N. J.

Application July 23, 1941, Serial No. 403,773

3 Claims. (Cl. 81—128)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to chucks, and more particularly to a chuck for use in assembling operations.

An object of this invention is to provide a device for completing the assembly of threaded male and female articles.

Another object of the invention is to provide an adjustable chuck which can be regulated to control the maximum predetermined torque which may be applied in assembling threaded objects.

A further object of the invention is to provide a chuck which automatically grips a work piece upon axial convergence of the chuck and work piece and is self-releasing upon recession of the chuck from the work piece.

The specific nature of the invention as well as other objects and advantages thereof will clearly appear from a description of a preferred embodiment as shown in the accompanying drawing in which:

Fig. 1 is a central vertical longitudinal section on the line 1—1 of Fig. 2 showing the chuck in its operative position when tightening a threaded head to an internally threaded body.

Fig. 2 is a plan view of the chuck.

Fig. 3 is a sectional view on the line 3—3 of Fig. 2 representing the chuck in its inoperative or work receiving position.

Fig. 4 is a bottom plan view of the chuck driver.

Fig. 5 is a sectional view on the line 5—5 of Fig. 4.

Fig. 6 is a plan view of the chuck jaws in an expanded position to receive a work piece, and Fig. 7 is a sectional view on the line 7—7 of Fig. 6.

Referring now to the drawing which shows a preferred embodiment of the invention, a hollow cylindrical body 1 is open at both ends and contains the chuck elements. The upper end of the body 1 is internally threaded at 2 to engage cooperating threads on a cap 3. The cap 3 has a central bore 4 which is adapted to receive a cylindrical sleeve 5. The diameter of the bore of body 1 decreases at 6 and thereby presents an internal annular shoulder 7. The lower end of the body 1 carries a circular flange 8 which leaves an aperture 9 of reduced diameter.

Within the body 1 is a chuck jaw driver 10 which is seated on the annular shoulder 7. Driver 10 has a disk-like top 11 with four depending wedge members 12. Driver 10 has a central aperture 13 in the top 11 and a pair of smaller apertures 14 disposed as shown in Fig. 4. The wedge members 12 are integral with the top 11 and are spaced equidistantly around the aperture 13. Camming surfaces 15 of the wedge members 12 face the axis of the bore 13.

Four chuck or socket jaws rest in the lower chamber 17 in the body or holder 1. Each chuck jaw 16 is a segment of a solid cylinder split axially twice in planes which are 90 degrees to each other, see Figs. 6 and 7. Each segment or jaw 16 has an angularly disposed slot 18 in its arcuate face and is conditioned to engage or fit one of the wedge members 12 of the driver 10. Coiled expanding springs 19 set in recesses 20 in the jaws 16 normally separate the jaws as shown in Fig. 6. Springs 19 also assist in maintaining the jaws 16 in the position shown in Fig. 3. Jaws 16 have a reciprocating movement in the lower chamber 17 in a manner which will be presently described. A circular disk 21 sets in arcuate grooves 22 on the interior faces of jaws 16 and assures a concerted movement of these gripping elements, see Figs. 3, 6 and 7. The lower inner faces of the jaw segments 16 are conditioned to form any desired tool grip such as the socket 23.

Positioned above the top 11 of the chuck jaw driver 10 is a circular pad or ring 24 of suitable friction material. Pad 24 has a central opening 25 and a pair of recesses 26 to receive pins 27 which are held in the two apertures 14 in the chuck driver 10 by a press fit. The pins 27 secure the pad 24 to the chuck jaw driver 10 and prevent relative rotation therebetween, see Fig. 3.

Above the friction disk 24 is a rigid friction or drive plate 28 with a threaded central shank 29. The shank 29 engages the internal threads 30 on the lower end of sleeve 5 and is thereby held securely thereto. Keyed to sleeve 5 by a pin 31 which passes through aligned radially disposed holes 32 in the sleeve is a drive shaft 33 of a rotating machine (not shown).

Resting on the top of friction plate 28 is a circular friction disk 34 of fibre or leather. Disk 34 has the shape of a ring and encloses the lower periphery of sleeve 5. Fig. 3 illustrates elongated pins 35 which pass through bores 36 in the nut or cap 3 and extend into suitable recesses 37 in friction ring 34 to lock it against rotation about sleeve 5.

A helical compression spring 38 is lodged in the aperture 13 of chuck driver 10 as shown in Figs. 1 and 3. The upper end of spring 38 bears against the lower central portion of the rigid pressure plate 28 and the lower end presses against the top faces of the chuck jaws 16. The spring 38 maintains the jaw segments 16 against the circular flange 8 of the chuck body 1 when in the inoperative position as shown in Fig. 3.

Cap 3 at the top of the chuck housing 1 is provided with four spaced open passages 39 which are internally threaded at the upper ends 40. Pressure plugs or plungers 41 are seated in the bottom of the passages 39 on the upper friction ring 34. Threaded adjusting nuts 42 are screwed into the bores 39 and bear against coiled spring 43 which exert pressure on the friction ring 34. A hole 44 may be provided in cap 3 to facilitate removal and insertion of the locking pin 31. This allows the removal of a chuck from the drive shaft 33 without dismantling the chuck.

The operation of the chuck is as follows: A threaded head or tool is started manually into the internal threads of a threaded body. Fig. 1 shows an artillery primer head 45 being tightened to the required extent into the primer body 46. After starting the two threaded components the primer body 46 is inserted in the jaws 47 of a reciprocating vice. The jaws 47 elevate and carry the primer head 45 to the rotating chuck which has its gripping jaws 16 in the position as shown in Fig. 3. The jaws are distended and present an enlarged gripping area or socket 23 which receives the primer head 45.

Further movement of the approaching vice jaws 47 carries the primer head into the gripping socket 23 and forces the jaws 16 upward against the resistance of compression spring 38. Wedge members 12 on the chuck jaw driver 10 ride in the channels 18 and cam the chuck segments 16 radially inward and lock the primer head 45 in the grip 23.

Friction plate 28 is being rotated by drive shaft 33 and drives the chuck driver 10 through the friction disk 24 in a manner which is customary in all friction disk clutches. When the primer head 45 is tightened into the primer body 46 to the necessary extent, the friction disk assembly acts as a slip clutch and the driven plate 11 of the chuck jaw driver 10 ceases to rotate. Rotation of the drive plate 28 continues. This slip clutch feature prevents injury to the chuck, the primer body and associated threads should the head have been started improperly.

Adjustment of the nuts 42 will alter the pressure applied to the friction disk assembly by the plungers 41. By this means the chuck clutch may be conditioned to transmit a maximum predetermined torque and will allow controlled torque settings, an important feature in the assembly of sensitive primers.

When the primer is completely assembled relative axial movement between the vice and chuck occurs. Spring 38 forces the chuck segments 16 downward in chamber 17 and the expanding springs 19 force the jaws 16 outward to the positions shown in Figs. 3 and 6. The gripping socket 23 is enlarged sufficiently near the end of the return stroke that the assembled primer 46 recedes from the chuck and is ready for release from the vice 47. This feature eliminates all necessity for placing the operator's hands on the rotating chuck and eliminates the resultant danger. It also frees the operator's hands for use in other assembly movements and hence accelerates production.

I claim:

1. In a device for assembling a pair of externally and internally threaded objects, a rotary chuck having a body with a right cylindrical chamber therein, a frictionally driven socket driver rotatable in said body, spaced radial wedge columns on said driver extending into said chamber, a movable, right cylindrical, segmental socket having grooves conditioned to slide on said wedge columns in said chamber, expanding means normally enlarging said segmental socket into engagement with the wall of said chamber, resilient means for urging said socket to the bottom of said chamber, said socket adapted when moved in a direction against the resistance of said resilient means by an object being assembled to be cammed toward the axis of rotation of said chuck by said wedge columns to engage and drive said object.

2. In an assembling device, a driving member having a right-circular cylindrical chamber therein, a frictionally driven member rotatable in the chamber about the axis thereof, said driven member comprising a circular disk including spaced radial wedge columns depending in the direction of the axis of the chamber, a right-circular cylindrical segmental socket member in the chamber, said socket member having grooves in sliding engagement with the radial wedge columns whereby the socket member has radial and axial movement on the columns, and resilient means in the chamber normally maintaining the socket member in the bottom of the chamber.

3. A self-opening chuck comprising, a driving member having a right-circular cylindrical chamber therein, a frictionally driven member rotatable in the chamber about the axis thereof, said driven member comprising a circular disk including spaced radial wedge columns disposed around the axis of the chamber, a right-circular cylindrical split-jaw member in the chamber, said jaw member having radially disposed grooves in sliding engagement with the radial wedge columns whereby the jaw member has combined radial and axial movement on the wedge columns, means in said split jaw member insuring conjoint movement, and resilient means in the chamber in engagement with the split jaw member normally maintaining said last named member in a distended position in the bottom of the chamber.

MATTHEW C. RICCIARDI.